United States Patent [19]

Keil et al.

[11] Patent Number: 5,124,436
[45] Date of Patent: Jun. 23, 1992

[54] AROMATIC COPOLYAMIDE

[75] Inventors: Günter Keil, Hofheim/Taunus; Karl Heinrich, Grossaitingen; Peter Klein, Wiesbaden, all of Fed. Rep. of Germany

[73] Assignee: Hoechst Aktiengesellschaft, Frankfurt am Main, Fed. Rep. of Germany

[21] Appl. No.: 664,948

[22] Filed: Mar. 5, 1991

[30] Foreign Application Priority Data

Mar. 7, 1990 [DE] Fed. Rep. of Germany ....... 4007142

[51] Int. Cl.$^5$ ................. C08G 69/02; C08G 69/12; C08G 69/32
[52] U.S. Cl. .................... 528/331; 528/125; 528/128; 528/183; 528/184; 528/185; 528/321
[58] Field of Search ............ 528/331, 321, 183, 184, 528/185, 125, 128

[56] References Cited

U.S. PATENT DOCUMENTS

| | | | |
|---|---|---|---|
| 4,511,709 | 4/1985 | Yoon et al. | 528/331 |
| 4,987,215 | 1/1991 | Keil et al. | 528/331 |
| 4,987,216 | 1/1991 | Keil et al. | 528/331 |

*Primary Examiner*—Harold D. Anderson

[57] ABSTRACT

Aromatic copolyamides, preparation thereof and structures formed therefrom

There are described aromatic copolyamides which are soluble in organic solvents for polyamides and which comprise at least 95 mol % of recurring structural units of formulae

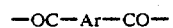

A

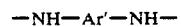

B

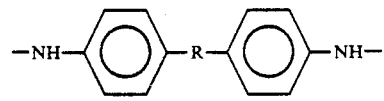

C

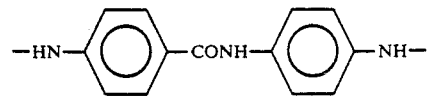

D and up to 5 mol % of meta-bonded structural units E and/or F derived from aromatic dicarboxylic acids (E') and/or from aromatic diamines (F'), the sum total of the mole fractions of structural units A+E and the sum total of the mole fractions of structural units B+C+D+F being essentially of equal magnitude.

The copolyamides of the present invention can be processed into fibers having high strengths and high breaking extensions.

8 Claims, 1 Drawing Sheet

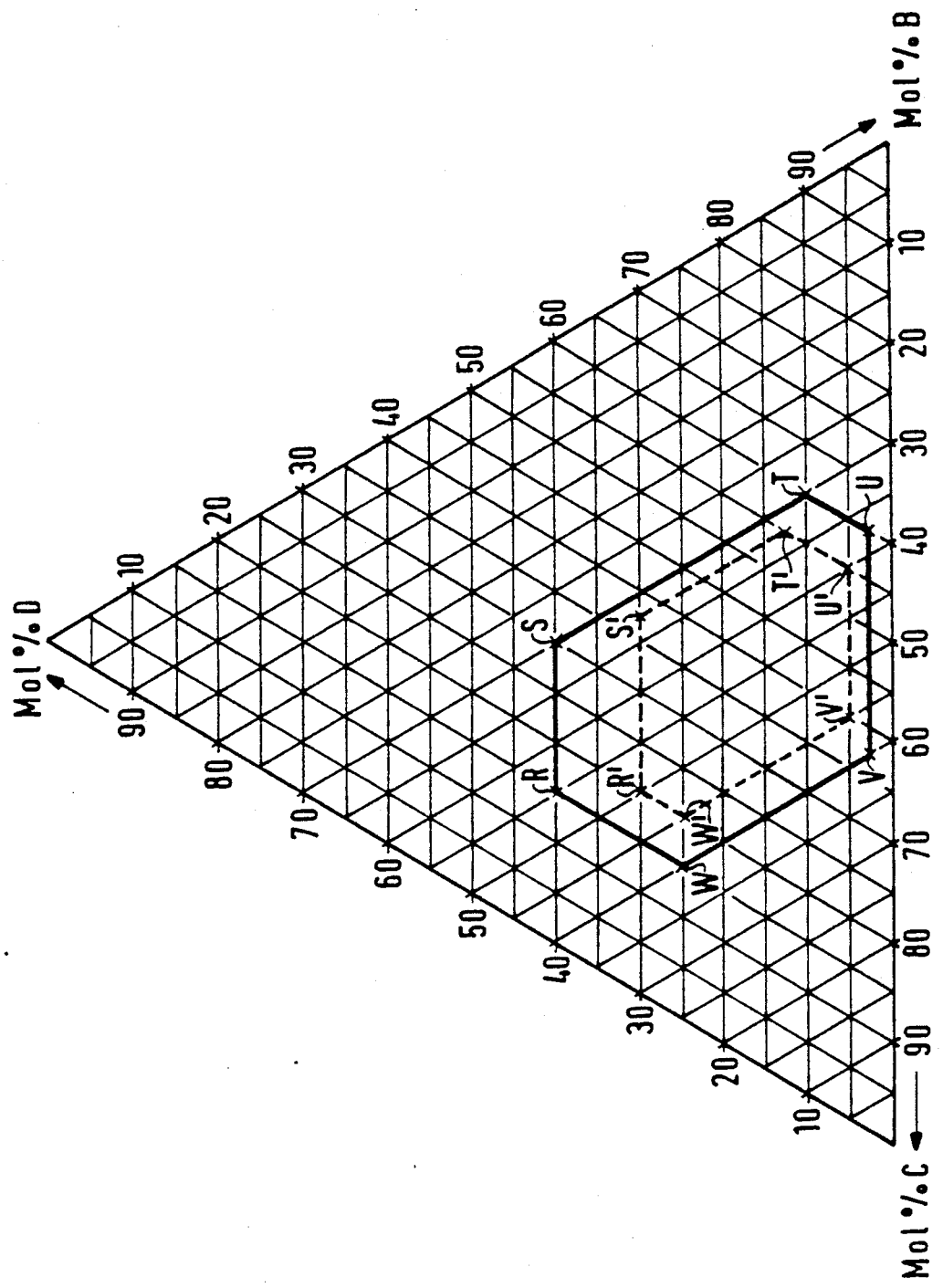

AROMATIC COPOLYAMIDE

The invention relates to novel aromatic copolyamides of the dicarboxylic acid/diamine type, processes for preparing same, and structures such as filaments, fibers, fiber pulp, films and sheets formed therefrom.

Aromatic polyamides (polyaramides) are known raw materials of high thermal and chemical stability and low flammability. Thus, fibers and films of such raw materials have very good mechanical properties, such as high strength and a high initial modulus (modulus of elasticity), and are highly suitable for engineering uses, for example for reinforcing plastics or as filter materials.

The polymers required therefor are best prepared in a conventional manner by reacting aromatic diamines with aromatic dicarbonyl dichlorides in aprotic organic solvents of the amide type (N,N-dimethylacetamide, N-methylpyrrolidone, N,N,N',N'-tetramethylurea and the like), in the presence or absence of calcium halides or lithium halides, and neutralizing the hydrogen chloride formed, for example with calcium oxide.

Filaments of polyaramides of high strength and high initial modulus are those in which the amide bonds are coaxial or almost parallel to one another, forming rigid, rodlike polymer molecules. Typical polyamide fibers of this kind are made for example of poly(p-phenyleneterephthalamide) Filaments of this type are described for example in German Patent No. 2,219,703.

This product has a number of advantages, but the preparation of the polyamide required and its processing are very difficult. For instance, because it is only sparingly soluble in polar organic solvents—even in the presence of inorganic salts such as calcium chloride or lithium chloride as solubilizer, this polymer, once formed, immediately precipitates from the reaction medium. It must be isolated, washed, dried and then redissolved in a spinning solvent. The preferred solvent for preparing spinning solutions is concentrated sulfuric acid, which presents special problems with handling (occupational hygiene, corrosion) and waste disposal.

Attempts have therefore been made to circumvent these difficulties by developing copolyamides which are readily soluble in the known amide type solvents, which are also readily spinnable and whose filaments, after drawing to a high draw ratio, exhibit high strength values and initial moduli.

For instance, DE-A-2,144,126 describes the preparation of soluble aromatic polyamides having a high modulus of elasticity in that substituted 3-(p-aminophenoxy)-4-aminobenzanilides together with terephthaloyl chloride give readily soluble polyamides which are spinnable and drawable into filaments of high strengths and initial moduli.

The increased solubility here is due to the metaorientation and the oxygen bridge atom. German Patent 25 56 883 and German Offenlegungsschrift 30 07 063 describe copolyamides of terephthalic acid, p-phenylenediamine and 3,4'-diaminodiphenyl ether which, in amide type solvents, give isotropic solutions of high spinnability. A very high draw ratio confers high strengths and moduli on the filaments. The disadvantage of the aforementioned processes is that the various amines required can only be prepared and purified in very costly processes.

For this reason there are proposals in DE-A-35 10 655, DE-A-36 05 394, EP-A-0 199 090 and US-A-4 847 354 for terephthalamides which contain 3 diamine components in certain, defined proportions and which are readily soluble in amide type solvents and can be shaped into filaments or films having very good strengths and moduli.

The disadvantage with these products and with filaments from all the abovementioned polyaramides is a relatively low breaking extension (usually ≦4%). This is disadvantageous for the further processing of the filaments, since a low breaking extension usually indicates high transverse brittleness.

Problems arise at yarn guide elements, deflecting rollers and the like which have a small radius of curvature.

It is therefore an object of the present invention to find such aromatic copolyamides as can be converted with the use of amide type solvents into shaped structures which will then be noteworthy for a number of physical properties. In the production of filaments and fibers appropriate drawing processes shall make it possible to obtain high strengths and in particular relatively high breaking extensions. The monomers required for preparing the copolyamides shall be readily accessible and the polymer solutions obtained by the process of polycondensation shall be directly spinnable or formable after a filtration process and appropriate deaeration.

This object is achieved by novel aromatic copolyamides which can be processed from solutions in aprotic solvents into shaped structures such as filaments, fibers, fiber pulp, sheets or films. The copolyamides required for this purpose are made up to at least 95 mol % of the following, exclusively para-linked, recurring structural units:

  A

  B

  C

  D up to 5 mol % of meta-bonded structural units E and/or F derived from aromatic dicarboxylic acids (E') and/or from aromatic diamines (F'), the sum total of the mole fractions of structural units A+E and the sum total of mole fractions of structural units B+C+D+F being essentially of equal magnitude.

In these formulae —Ar— and —Ar'— are divalent aromatic radicals whose valence bonds are in a para or similar coaxial or parallel position and which may be substituted by one or two inert radicals, such as lower alkyl or halogen, and —R— is an unsubstituted or substituted methylene radical or a grouping —O—Ar—O—, where —Ar— has the same structure a indicated above.

The valence bonds which are in a coaxial or parallel position point in opposite directions An example of coaxial oppositely directed bonds are the bonds of 4,4'-biphenylene. An example of parallel oppositely directed bonds are the bonds of 1,5-naphthylene and 2,6-naphthylene, while the bonds of 1,8-naphthylene are parallel but point in the same direction.

Divalent aromatic radicals —Ar—in which the valence bonds are in a para or similar coaxial or parallel position include monocyclic or bicyclic, even fused, aromatic radicals such as 1,4-phenylene, 1,4-naphthylene, 1,5-naphthylene, 2,6-naphthylene and 1,4-biphenylene.

Divalent aromatic radicals —Ar—in which the valence bonds are in a para or similar coaxial or parallel position include monocyclic or bicyclic fused aromatic radicals such as 1,4-phenylene, 1,4-naphthylene, 1,5-naphthylene and 2,6-naphthylene. Preferably —AR— —and —Ar'—are each 1,4-phenylene.

The radicals —Ar—and —Ar'—may be monosubstituted or disubstituted by lower alkyl radicals, i.e. straight-chain or branched alkyl radicals of from 1 to 4 carbon atoms, or by halogen, in particular by F, Cl or Br.

Preferred alkyl substituents are straight-chain and are in particular methyl and ethyl. The preferred halogen substituent is chlorine.

The polyamides of the present invention may contain the unsubstituted radicals —Ar—and —Ar'—and the alkyl-and/or and/or halogen-substituted radicals —Ar— —and —Ar'—side by side in varying proportions.

In effect, the polyamide may contain one or more kinds of substituted radicals —Ar—and —Ar'—; for example, it may contain exclusively methyl-substituted —Ar—and/or —Ar'—, or it may contain portions of —Ar—and/or —Ar'—with different alkyl substituents and/or with halogen substituents.

However, the polyamides of the present invention also contain exclusively unsubstituted or substituted radicals —Ar—and —Ar'—. For cost reasons preference is given to those polyamides of the present invention which contain only unsubstituted or up to about 30 mol % of substituted radicals —Ar—and —Ar'—.

Structural units E and F with meta bonds for the purposes of the present invention are those which contain an aromatic nucleus whose bonds in the backbone of the polymer molecule are meta relative to one another.

Such structural units are for example the radicals of isophthalic acid, m-phenylenediamine, 3,4'-diaminobiphenyl or their alkyl and/or alkoxy substitution products, or 3,4'- or 3',4-diaminobenzanilide.

The structural units B, C and D composed of diamines copolymerized into the polyamide are present in the aromatic polyamides of the present invention only in the following specific mole percent ranges, based on the total amount of components B, C and D:

| |
|---|
| Structural units B 15–60 mol %, preferably 20–55 mol % |
| Structural units C 30–60 mol %, preferably 32.5–55 mol % |
| Structural units D 2.5–40 mol %, preferably 5–30 mol % |

These mol % units are based on the total amount of the diamine structural units B, C and D.

They are marked in the accompanying figure by the cornerpoints R, S, T, U, V, W and preferably R', S', T', U', V'and W'.

The inherent viscosity of the formable copolyamides shall be between 2.5 and 5.0 dl/g. It was determined on solutions of 0.5 g amounts of polymer in 100 ml of 98% strength by weight sulfuric acid at 25° C.

The inherent viscosity is defined by the expression $$\eta_{inh} = \frac{\ln \eta_{rel}}{c}$$

where $\eta_{rel}$ is the relative viscosity and c the concentration in g/100 ml.

The excellent properties of the shaped structures of the present invention are due to the incorporation of the amine units B, C and D within the specified limits. As is evident from the comparative experiments described hereinafter, the technological properties, in particular the breaking extension, drop off markedly outside the specified limits. Filaments formed from the claimed copolyamides exhibit without exception a high drawability (limit ≧5:1) and a high breaking extension, compared with other aramids (≧3.5%). Aromatic polyamides which include individual instances of the amine components B, C and D are common knowledge. They do not exhibit any outstanding properties, as is evident from the following references and the comparative experiments which have been carried out.

For instance, it is known to use terephthalic acid (A) and p-phenylenediamine radicals (B) for polyamides, for example from the above-cited German Patent 2,219,703. These products are virtually no longer soluble in amide type solvents.

The use of amine components of structure C for preparing polyamides has likewise been repeatedly described. Diamine components having a substituted or unsubstituted methylene bridge are already mentioned in DE-C-22 19 703. Similarly, the use of aromatic diamines having two ether groups is already known, for example from DE-A-15 95 681.

Again, the use of 4,4'-diaminobenzanilide (D) as amide component has been repeatedly described:

a) In U.S. Pat. No. 3,671,542 it is shown in Example 31 that the polyamide of terephthaloyl chloride and 4,4'-diaminobenzanilide is sparingly soluble in amide type solvents (cf. also U.S. Pat. No. 3,767,756, Example 5). Filaments of this polymer spun from sulfuric acid attain only moderate strengths and moduli.

According to EP-A-218 269, Tables A and B, a diaminobenzanilide-terephthalamide spun from sulfuric acid attains high strength and high moduli only after a thermal aftertreatment. Compare at this point also EP-A-168 879.

b) It is also stated in U.S. Pat. No. 3,671,542 that a copolyamide of p-phenylenediamine + 4,4'-diaminobenzanilide (1:1) and terephthaloyl chloride +dibenzoyl chloride or 2,6-naphthaloyl chloride (1:1) becomes gellike in amide type solvents within a short time. The properties of the filaments (spun from sulfuric acid) are moderate.

c) According to Preston et al., Polymer Letters 4, 1033 (1966), also cited in DE-A-21 44 126, page 1, filaments of 4,4,-diaminobenzanilide-terephthalamide exhibit low strengths and particularly low moduli.

Compare at this point also:
U.S. Pat. No. 3,354,125, Example 4
J. Polym. Sci. 22, 855 (1969)
J. Appl. Polym. Sci. 16, 3237 (1972), page 3239
J. Macromolek. Sci. Chem. Ed. A7, 325 (1973)
Vysokomol. Soed. Ser. B, 25 (9), 672.

d) The preparation of diaminobenzanilide-terephthalamide via the Yamzaki reaction (free acid +diamine +pyridine +diphenyl phosphite) gives only low viscosities: Preston et al., J. Poly,. Sci; Polym. Chem. Ed. 20, 79 (1982).

e) J. Macromolek, Sci, Chem., A7, 325 (1973), and Kogyo Kagaku Zassi 1968, 71 (3), 443, likewise describe copolyamides with 3,4'-diaminobenzanilide.

As can be discerned from the cited references, the polyamides in question are usually insoluble in amide type solvents or else the filaments spun from organic solvents have only moderate properties.

By contrast, the polyamides according to the present invention, which have been prepared by using a mixture of the amine components B+C+D in certain proportions, surprisingly are soluble in amide type solvents and filaments spun therefrom do have a high strength and a high initial modulus and also a relatively high extension.

To prepare the copolyamides of the present invention it is possible to use the following compounds:
Examples of suitable dicarboxylic acid derivatives of the formula

are 4,4'-sulfonyldibenzoyl dichloride, 4,4'-oxydibenzoyl dichloride, 4,4'-biphenyldicarbonyl dichloride and 2,6-naphthalenedicarbonyl dichloride, but in particular terephthaloyl dichloride.

A suitable aromatic diamine of the structure

is in particular p-phenylenediamine.

Suitable diamine components C' of the formula

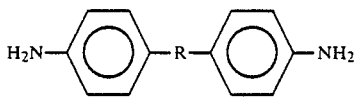

are in particular 4,4'-diaminodiphenylmethane, 2,2-bis-(4-aminophenyl)propane and in particular 1,4-bis(4-aminophenoxy)benz The solution condensation of the aromatic dicarbonyl dichlorides with the mixtures of aromatic diamines takes place in aprotic polar solvents of the amide type, for example in N,N-dimethylacetamide or in particular N-methyl-2-pyrrolidone. If necessary, to increase their solvent power and/or to stabilize the polyamide solutions, these solvents may be admixed in a known manner with halide salts of groups one and two of the periodic table. Preferred additions are calcium chloride and/or lithium chloride.

The polycondensation temperatures are customarily between −20° C. and +120° C., preferably between +10° C. and +100° C. Particularly good results are obtained at reaction temperatures between +10° C. and +80° C. The polycondensation reactions are preferably carried out in such a way that, after the reaction has ended, from 2 to 15, preferably from 5 to 10,% by weight of polycondensate is present in the solution. Particularly good results are obtained with concentrations of from 5.5 to 7.0% by weight.

A viscosity which is adequate for further processing is obtained when the inherent viscosity of the polymer is within the range from 2.5 to 5.0 dl/g.

The polycondensation can be stopped in a conventional manner, for example by addition of monofunctional compounds, for example acetyl chloride.

Thereafter the hydrogen chloride formed, which is loosely bound to the amide type solvent, is neutralized by addition of basic substances. Suitable for this purpose are for example lithium hydroxide and calcium hydroxide, but in particular calcium oxide. To produce formed structures as per the present invention, the above-described polyamide solutions of the present invention are filtered, devolatilized and further processed in a conventional manner, not claimed here, into filaments, fibers, fiber pulp, films or sheets. This may be done for example by using a wet spinning insulation where the polymer solution is extruded through suitable dies into a coagulation bath, and the filaments obtained are passed through wash baths and are drawn at elevated temperature. Suitable coagulation baths are aqueous solutions of the same amide type solvent as also used for preparing the polymer. However, it is also possible to use aqueous salt solutions, for example calcium chloride solutions.

In the production of filaments, fibers and films, the overall draw ratio is the product of a small wet stretch and a higher contact stretch. In the contact stretch, the filaments pass for example over hotplates which have surface temperatures of from 350° C. to 460° C., preferably from 410° C. to 460° C., and in the course of passing thereover they are drawn within the range from 5.0:1 to about 16:1, preferably from 5.5:1 to 15:1.

Another suitable version of the spinning process is the "dry jet wet spinning process" as described for example in US-A-34 14 645. There the direction of spinning is downward and the filaments, on emerging from the jet, first pass through a gaseous medium, preferably air, and then enter into an aqueous coagulation bath. The rest of the treatment of the filaments thus produced is as described above. The shaped articles, for example, fibers, filaments, fiber pulp or films, produced from the raw materials of the present invention are used for example as reinforcing materials for plastics and as engineering materials for filtration and insulation. For insulation purposes it is also possible to apply a polymer solution in film form to another article and then to remove the solvent and any solubilizer present.

The examples which follow serve to illustrate the invention. The proportions of the dicarboxylic acid components and the diamino components were calculated separately to 100 mol %. The inherent viscosities were determined as indicated above.

EXAMPLE 1

Aromatic polyamide of 100 mol % of terephthaloyl chloride, 50 mol % of 1,4-bis(4'-aminophenoxy)benzene, 25 mol % of p-phenylenediamine and 25 mol % of 4,4'-diaminobenzanilide.

58.5 g (0.2 mol) of 1,4-bis(4'-aminophenoxy)benzene, 10.8 g (0.1 mol) of p-phenylenediamine, 22.7 g (0.1 mol) of 4,4'-diaminobenzanilide and 11.0 g of dry lithium chloride are dissolved under nitrogen in 2,200 g of N-methylpyrrolidone and reacted at between 0° C. and 69° C. with 82.2 g of pulverulent terephthaloyl chloride in the course of 90 min. The mixture is neutralized with 24.5 g of calcium oxide (96 percent pure) and subsequently stirred at about 80° C. for 20 min. The solution contains 6% of copolyamide, 1.85% of calcium chloride and 0.46% of lithium chloride. The inherent viscosity of the dissolved polyamide is 3.49 dl/g. The solution is filtered, devolatilized and wet-spun by spinning it at a speed of 8.9 m/min from a die having 50 holes each 0.1 mm in diameter into a horizontally disposed coagulation bath comprising an 80° C. solution of 22% of N-methyl-pyrrolidone in water. The multifilament yarn passes through wash baths, drying godets (180° C.) and finally over four hotplates having a surface temperature of 410° C. and is taken off at 105 m/min. The multifilament yarn is then, as in the examples which follow, provided with a protective twist corresponding to am=30 (German Standard Specification DIN 53 832, part 1) and then tested. In this example the individual filament has a linear density of 0.78 dtex (German Standard Specification DIN 53830), the tenacity is 174 cN/tex and the breaking extension is 4.4% (German Standard Specification DIN 53 834, part 1). The modulus is 39.1 N/dtex. The modulus is calculated from the gradient of the tenacity/strain diagram at between 0.3 and 0.5% extension.

EXAMPLES 2 TO 9

By applying the method of Example 1 to the reaction conditions specified in Table 1 and to the starting materials mentioned therein it is possible to prepare further aromatic polyamides according to the present invention.

The polyamides thus obtained, which differ in respect of the proportions accounted for by the diamine structural units B, C and D, can then be spun directly from the reaction solution and drawn as described in Example 1.

The spinning and drawing conditions and properties of the filaments thus obtained are likewise shown in Table 1.

The key to the abbreviations used in Table 1 is as follows: TPC=terephthaloyl chloride; PPD=p-phenylenediamine; DABA=4,4'-diaminobenzanilide; DADP.M=4,4'-diaminodiphenylmethane; BAPOB=1,4-bis(4,-aminophenoxy)benzene; NMP=N-methylpyrrolidone; W=wet spinning; DW =dry/wet spinning.

TABLE 1

| Example | | 2 | 3 | 4 | 5 | 6 | 7 | 8 | 9 |
|---|---|---|---|---|---|---|---|---|---|
| Polymer | | | | | | | | | |
| PPD | mol | 0.15 | 0.90 | 0.20 | 0.3 | 1.35 | 1.35 | 1.12 | 0.10 |
| | mol % | 37.5 | 37.5 | 50 | 50 | 45 | 45 | 40 | 25 |
| | g | 16.2 | 97.3 | 21.6 | 32.4 | 145.9 | 145.9 | 121.1 | 10.8 |
| DABA | mol | 0.10 | 0.60 | 0.05 | 0.06 | 0.45 | 0.375 | 0.42 | 0.1 |
| | mol % | 25 | 25 | 12.5 | 10 | 15 | 12.5 | 15 | 25 |
| | g | 22.7 | 136.4 | 11.4 | 13.6 | 102.3 | 85.2 | 95.4 | 22.7 |
| DADPM | mol | | | | 0.24 | 1.2 | 1.275 | 1.26 | 0.20 |
| | mol % | | | | 40 | 40 | 42.5 | 45 | 50 |
| | g | | | | 47.6 | 237.9 | 252.8 | 249.8 | 39.65 |
| BAPOB | mol | 0.15 | 0.90 | 0.15 | | | | | |
| | mol % | 37.5 | 37.5 | 37.5 | | | | | |
| | g | 43.8 | 263.1 | 43.8 | | | | | |
| Salt | g | 10.3 | 80.8 | 10.8 | 13.1 | | | | 9.5 |
| | | LiCl | CaCl$_2$ | LiCl | LiCl | | | | LiCl |
| NMP | g | 2056 | 12315 | 2165 | 2606 | 13391 | 12149 | 13871 | 1905 |
| TPC | g | 82.0 | 485.8 | 82.0 | 123.8 | 608.5 | 609.1 | 568.5 | 81.8 |
| Reaction time min. | | 75 | 35 | 70 | 41 | 35 | 24 | 31 | 75 |
| Reaction temp. °C. | | 10–72 | 30.6–57.4 | 10–70 | 32.5–60 | 30.2–54.6 | 31–57.1 | 30.4–56.6 | 10–68 |
| Acetyl chloride g | | / | 3.8 | / | / | 4.7 | 4.7 | 4.4 | / |
| CaO 96% g | | 24.5 | 222[1) | 24.5 | 36.5 | 278[1) | 278[1) | 259[1) | 24.5 |
| Polymer conc. % | | 6.0 | 6.0 | 5.48 | 6.0 | 6.0 | 6.54 | 5.53 | 6.0 |
| Salt conc. % | | 2.0 | 2.58 | 1.89 | 2.33 | 2.28 | 2.49 | 2.07 | 2.13 |
| | | CaCl$_2$ +0.46 LiCl | CaCl$_2$ | CaCl$_2$ +0.46 LiCl | CaCl$_2$ +0.46 LiCl | CaCl$_2$ | CaCl$_2$ | CaCl$_2$ | CaCl$_2$ +0.46 LiCl |
| Polymer viscosity η inh dl/g | | 3.48 | 3.86 | 4.61 | 3.34 | 4.59 | 4.30 | 4.62 | 2.98 |
| Spinning and drawing | | | | | | | | | |
| Process | | W | DW | W | W | DW | DW | DW | W |
| Temp. of spinning solution °C. | | 95 | 90 | 95 | 95 | 100 | 130 | 130 | 85 |
| Die hole number | | 50 | 100 | 50 | 50 | 50 | 100 | 100 | 50 |
| Die hole diameter mm | | 0.10 | 0.15 | 0.10 | 0.10 | 0.10 | 0.15 | 0.15 | 0.10 |
| Distance from die to coagulation bath mm | | / | 40 | / | / | 40 | 40 | 40 | / |
| Coagulation bath composition % of NMP | | 35 | 35 | 35 | 35 | 35 | 35 | 35 | 35 |
| Coagulation bath temp. °C. | | 60 | 60 | 60 | 60 | 80 | 80 | 80 | 60 |
| Take-off speed m/min | | 8.9 | 16 | 8.3 | 15.7 | 16 | 16 | 16 | 8.2 |
| Drying godet temp. °C. | | 180 | 120 160 240 | 180 | 160 180 | 120 240 | 120 240 | 120 240 | 180 |
| Hotplate temp. °C. | | 430 | 460 | 410 | 440 | 410 | 390–410 | 410–430 | 350 |
| Take-off speed | | 85.7 | 100.8 | 64.9 | 110 | 90.3 | 91.2 | 111.2 | 45.5 |

TABLE 1-continued

| Example | 2 | 3 | 4 | 5 | 6 | 7 | 8 | 9 |
|---|---|---|---|---|---|---|---|---|
| m/min | | | | | | | | |
| Filament properties | | | | | | | | |
| Filament dtex | 1.14 | 2.25 | 1.16 | 1.28 | 2.4 | 2.76 | 1.97 | 0.96 |
| Tenacity cN/tex | 163 | 185 | 147 | 108 | 114 | 122 | 115 | 110 |
| Extension % | 3.7 | 4.1 | 3.7 | 4.2 | 4.2 | 4.9 | 5.0 | 5.5 |
| Initial modulus N/tex | 46.8 | 40 | 43.3 | 31.8 | 29 | 24 | 24 | 25.4 |

[1] 65 percent suspension of 96% pure CaO in NMP

Comparative Examples 1 to 6

The method of Operative Example 1 was applied to the reaction conditions specified in Table 2 and to the starting materials mentioned therein to prepare further aromatic polyamides.

The polyamides thus obtained, which differ in respect of the proportions accounted for the diamine structural units B, C and D, were then directly spun from the reaction solution and drawn as described in Example 1.

The spinning and drawing conditions and the properties of the filaments thus obtained are likewise shown in Table 2.

The abbreviations used in Table 2 are the same as those used in Table 1.

TABLE 2

| Example | | Comparative Examples |  |  |  |  |  |
|---|---|---|---|---|---|---|---|
| | | 1 | 2 | 3 | 4 | 5 | 6 |
| Polymer | | | | | | | |
| PPD | mol | 0.08 | 0.075 | 0.20 | 0.15 | 1.16 | 1.10 |
| | mol % | 20 | 25 | 50 | 37.5 | 40 | 25 |
| | g | 8.65 | 8.1 | 21.6 | 16.2 | 17.3 | 10.8 |
| DABA | mol | 0.2 | 0.15 | 0.1 | 0.15 | 0.12 | 0.20 |
| | mol % | 50 | 50 | 25 | 37.5 | 30 | 50 |
| | g | 45.45 | 34.1 | 22.7 | 34.1 | 27.3 | 45.45 |
| DADPM | mol | | | | | | 0.10 |
| | mol % | | | | | | 25 |
| | g | | | | | | 19.8 |
| BAPOB | mol | 0.12 | 0.075 | 0.1 | 0.1 | 0.12 | |
| | mol % | 30 | 25 | 25 | 25 | 30 | |
| | g | 35.1 | 21.9 | 29.2 | 29.2 | 35.1 | |
| Salt | g | 10.8 LiCl | 12.4 LiCl | 9.6 LiCl | 10.0 LiCl | 10.1 LiCl | 9.8 CaCl$_2$ + 9.8 LiCl |
| NMP | g | 2156 | 2326 | 2113 | 2005 | 2007 | 1941 |
| Reaction time min. | | 45 | 50 | 75 | 60 | 75 | 105 |
| Reaction temp. °C. | | 11–64 | 10–70 | 10–74 | 10–74 | 10–70 | 8–69 |
| CaO 96% g | | 24.5 | 18.4 | 24.5 | 24.5 | 24.5 | 24.5 |
| Polymer conc. % | | 6.0 | 4.0 | 5.47 | 6.0 | 6.0 | 6.0 |
| Salt conc. % | | 1.89 CaCl$_2$ +0.46 LiCl | 1.35 CaCl$_2$ +0.5 LiCl | 1.94 CaCl$_2$ +0.42 LiCl | 2.03 CaCl$_2$ +0.46 LiCl | 2.02 CaCl$_2$ +0.46 LiCl | 254 CaCl$_2$ +0.46 LiCl |
| Polymer viscosity η inh dl/g | | 4.48 | 4.62 | 4.16 | 4.69 | 3.13 | 2.12 |
| Spinning and drawing | | | | | | | |
| Process | | W | W | W | W | W | W |
| Temp. of spinning Solution °C. | | 85 | 80 | 98 | 85 | 100 | 75 |
| Die hole number | | 50 | 50 | 50 | 50 | 50 | 50 |
| Die hole diameter mm | | 0.10 | 0.10 | 0.10 | 0.10 | 0.10 | 0.10 |
| Distance from die to coagulation bath mm | | / | / | / | / | / | / |
| Coagulation bath composition % of NMP | | 35 | 35 | 35 | 35 | 35 | 35 |
| Coagulation bath temp. °C. | | 60 | 60 | 60 | 60 | 60 | 40 |
| Take-off speed m/min | | 8.1 | 16.1 | 8.3 | 8.2 | 8.1 | 8.2 |
| Drying godet temp. °C. | | 180 | 160 180 250 | 180 | 180 | 180 | 180 |
| Hotplate temp. °C. | | 470 | 350–440 | 440 | 450 | 450 | 483 |
| Take-off speed m/min | | 30.6 | 27.0 | 22.1 | 35.0 | 20.8 | |
| Filament properties | | | | | | | |
| Filament dtex | | 0.8 | 4.38 | 2.78 | 2.24 | 0.72 | 4.14 |

TABLE 2-continued

| | Comparative Examples | | | | | |
|---|---|---|---|---|---|---|
| Example | 1 | 2 | 3 | 4 | 5 | 6 |
| Tenacity cN/tex | 98 | 62 | 71 | 88 | 117 | 40 |
| Extension % | 2.1 | 2.5 | 2.5 | 2.4 | 2.7 | 1.6 |
| Initial modulus N/tex | 43.3 | | | | 48.0 | 35.8 |

The comparative experiments show that aromatic polyamides whose compositions are outside the areas of the present invention can likewise be spun into filaments, but that these filaments do not have the excellent mechanical properties, in particular the relatively high extensions, of the filaments according to the present invention.

We claim:

1. An aromatic copolyamide which is soluble in organic solvents for polyamides, comprising at least 95 mol % of recurring structural units of formulae

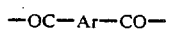   A

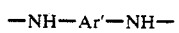   B

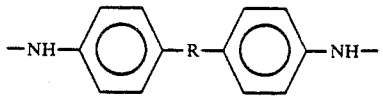   C

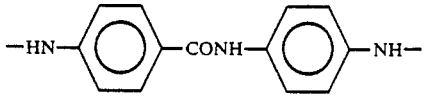   D and up to 5 mol % of meta-bonded structural units E or F or E and F derived from aromatic dicarboxylic acids (E') or from aromatic diamines (F) or from (E') and (F'), the sum total of the mole fractions of structural units A+E and the sum total of mole fractions of structural units B+C-D+F being essentially of equal magnitude, —Ar— and —Ar'— are divalent aromatic radicals whose valence bonds are in a para or similar coaxial or parallel position and which are unsubstituted or are substituted by one or two inert radicals, and —R— is an unsubstituted or substituted methylene radical or a grouping —O—Ar—O—, where —Ar— has the same structure as indicated above, and the proportions of the diamine components B, C and D relative to the total amount of the diamine components in mol % are within an area which is defined by the following cornerpoints:

Point R corresponds to 15% of B, 45% of C and 40% of D

Point S corresponds to 30% of B, 30% of C and 40% of D

Point T corresponds to 60% of B, 30% of C and 10% of D

Point U corresponds to 60% of B, 37.5% of C and 2.5% of D

Point V corresponds to 37.5% of B, 60% of C and 2.5% of D

Point W corresponds to 15% of B, 60% of C and 25% of D and the copolyamide has an inherent viscosity of about 2.5-5.0 dl/g measured in solutions of 0.5 g of polyamide in 100 ml of 98% strength by weight sulfuric acid at 25° C.

2. An aromatic copolyamide as claimed in claim 1, wherein —Ar— and —Ar'— are each 1,4-phenylene.

3. An aromatic copolyamide as claimed in claim 1, wherein —R— is —CH$_2$—.

4. An aromatic copolyamide as claimed in claim 1, wherein —R— is

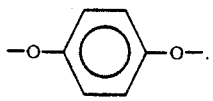

5. An aromatic copolyamide as claimed in claim 1, wherein the proportions of the diamine components B, C and D relative to the total amount of diamine components in mol % are within an area which is defined by the following cornerpoints Point R' corresponds to 20% of B, 50% of C and 30% of D Point S' corresponds to 37.5% of B, 32.5% of C and 30% of D Point T' corresponds to 55% of B, 32.5% of C and 12.5% of D Point U' corresponds to 55% of B, 40% of C and 5% of D Point V' corresponds to 40% of B, 55% of C and 5% of D Point W' corresponds to 20% of B, 55% of C and 25% of D 6. An aromatic copolyamide as claimed in claim 1, wherein the meta-bonded structural unit is the divalent radical of isophthalic acid or of m-phenylenediamine or of 3,4'- or 3',4-diaminobenzanilide or a mixture thereof.

7. A formed structure comprising an aromatic polyamide of claim 1.

8. A formed structure as claimed in claim 7, wherein said structure is a filament, fiber, fiber pulp, fiber or a sheet.

* * * * *